(12) United States Patent
Claussen et al.

(10) Patent No.: US 7,195,579 B2
(45) Date of Patent: Mar. 27, 2007

(54) AUTOMATED INTER-AXLE DIFFERENTIAL LOCKING SYSTEM ACTUATION ENHANCEMENT

(75) Inventors: Stephen P. Claussen, Richland, MI (US); Leo J. Wenstrup, Portage, MI (US)

(73) Assignee: Dana Corporation, Toledo, OH (US)

( * ) Notice: Subject to any disclaimer, the term of this patent is extended or adjusted under 35 U.S.C. 154(b) by 232 days.

(21) Appl. No.: 11/050,122

(22) Filed: Feb. 3, 2005

(65) Prior Publication Data

US 2006/0172852 A1 Aug. 3, 2006

(51) Int. Cl.
*B60W 10/04* (2006.01)
(52) U.S. Cl. .......................... 477/35; 477/107
(58) Field of Classification Search ................. 477/35, 477/107, 110
See application file for complete search history.

(56) References Cited

U.S. PATENT DOCUMENTS

| | | | |
|---|---|---|---|
| 2,603,108 A | 7/1952 | Carlson | |
| 4,050,534 A | 9/1977 | Nelson et al. | |
| 4,671,373 A | 6/1987 | Sigl | |
| 4,937,750 A | 6/1990 | Gilliam | |
| 5,033,329 A * | 7/1991 | Tezuka | 477/35 |
| 5,071,392 A | 12/1991 | Stall et al. | |
| 5,130,928 A | 7/1992 | Petersen | |
| 5,247,443 A | 9/1993 | Gilliam | |
| 5,259,476 A * | 11/1993 | Matsuno et al. | 180/197 |
| 5,301,769 A | 4/1994 | Weiss | |
| 5,364,319 A * | 11/1994 | Boll et al. | 475/224 |
| 5,545,103 A | 8/1996 | Gustin | |
| 5,676,219 A | 10/1997 | Fruhwirth et al. | |
| 5,860,889 A | 1/1999 | Schlosser et al. | |
| 5,927,422 A | 7/1999 | Schakel | |
| 5,989,147 A | 11/1999 | Forrest et al. | |
| 6,174,255 B1 | 1/2001 | Porter et al. | |
| 6,336,069 B1 | 1/2002 | Hasegawa et al. | |
| 6,487,486 B1 | 11/2002 | Anderson | |
| 6,524,207 B2 | 2/2003 | Murakami et al. | |
| 6,579,204 B2 | 6/2003 | Brown et al. | |
| 6,776,275 B2 | 8/2004 | Gratzer | |

\* cited by examiner

*Primary Examiner*—Ha Ho
(74) *Attorney, Agent, or Firm*—Marshall & Melhorn LLC

(57) ABSTRACT

An actuation enhancement for an automated vehicle inter-axle differential (IAD) locking system. The vehicle having an engine and a tandem drive axle. The IAD actuation enhancement locking system comprises a rotating sliding clutch and a rotating side helical gear, which are capable of an engagement mode and a disengagement mode, a microprocessor, and an electrical connection between the microprocessor and an engine electronic control unit. When the sliding clutch and the helical gear are placed in the engagement mode or are placed in the disengagement mode, the microprocessor momentarily communicates a data link message to the engine electronic control unit to break engine torque, to facilitate engagement or disengagement of the sliding clutch and the helical gear.

12 Claims, 9 Drawing Sheets

AUTOMATED INTER-AXLE DIFFERENTIAL LOCKING SYSTEM ACTUATION ENHANCEMENT

FIELD OF THE INVENTION

The present invention relates to an actuation enhancement for an automated vehicle inter-axle differential locking system.

BACKGROUND OF THE INVENTION

Tandem drive axle assemblies having a forward rear axle and a rearward rear axle in proximity with each other are well known. Such tandem drive assemblies are widely used on heavy duty trucks and other over-the-road vehicles, such as busses, which have a high vehicle weight and/or a high load carrying capacity. In such assemblies, both rear axles may be power driven.

An inter-axle differential (IAD) is commonly employed in such vehicles to split the input shaft torque between the front and rear axle of the tandem. It is common for a vehicle operator to engage and disengage a lock out that overrides or disables the IAD through the use of a pneumatic switch, which typically is mounted on the vehicle dash. The pneumatic switch, in turn, applies air to an axle mounted actuator, which engages a sliding dog clutch to "lock" the inter-axle differential.

However, there are several shortcomings to the above-described manual methods of engaging/disengaging the IAD. First, failure of the vehicle operator to notice that wheel end slip is occurring and then to engage the IAD, can result in spin out failures. Second, engagement of the IAD, while significant slipping is in process, can result in damage to either or both of the drive axles. Third, leaving the IAD engaged for an extended length of time can result in "drive line wind-up" and a resulting inability to disengage the IAD without reversing the vehicle. Fourth, since the actuation of the engagement and disengagement of the IAD are typically switched on or switched off by the operator, the IAD does not smoothly transition from one mode to the other. As a result of these shortcomings, extended wear can occur and the operator may not notice the wear, as actual engagement and disengagement of the IAD is not typically indicated to the operator.

More recently, automatic differential lockout mechanisms have come into use that attempt to minimize wear from engaging or disengaging of the differentials. U.S. Pat. No. 4,671,373 to Sigl discloses a locking-type differential being automatically prevented from engaging upon certain vehicle operating conditions. For example, if the steering wheel is deflected or transverse acceleration is sensed, the differential will not be allowed to be locked. The differential is likewise unlocked or prevented from locking if, for example, the brakes are applied or the engine is operating under an idle condition. On the other hand, for example, if a kick-down signal from the accelerator is sensed, or if the difference in speed of driven and rolling wheels exceeds a predetermined amount, the differential is controlled to lock.

U.S. Pat. No. 5,071,392 to Stall et al. discloses a process of continuously controlling the degree of locking of open differential drives in a driven axle of a multi-axle vehicle where the differential speed of the driven wheels is compared to the vehicle speed of the non-driven wheels.

U.S. Pat. No. 5,130,928 to Petersen provides an anti-lock and/or anti-slip apparatus for commercial type vehicles where an electronic system determines whether the rotational speed of the cardan shaft varies from the average speed of the monitored wheels. Upon receipt of a variance, the electronic system controls the locking of a longitudinal differential.

U.S. Pat. No. 5,989,147 to Forrest et al. discloses an electronically controllable differential which transfers a predetermined amount of torque through a rotatable differential based upon, in part, a predetermined rotational condition of the side gear.

U.S. Pat. No. 6,174,255 to Porter et al. teaches a differential lock control system that employs speed sensors and an articulation angle sensor that communicate speed signals and an articulation angle signal to a microprocessor for controlling the locks on front and rear differentials for an articulated work vehicle. In an automatic mode, the microprocessor controls the locking of the differentials by comparing predicted axle speeds to actual speeds received from the speed sensors and an articulation angle from the articulation sensor.

U.S. Pat. No. 6,487,486 to Anderson discloses a process for continuously controlling the transfer of torque within a differential while utilizing control logic methodology. Changes in torque values are determined from output shafts speeds and vehicle speeds.

U.S. Pat. No. 6,579,204 to Brown et al. generally discloses a full-time power transfer system for controlling speed differentiation and torque biasing across an interaxle differential in response to changes in sensors that monitor dynamic and operational characteristics of the vehicle.

Even with the above-described current automatic means for controlling the engagement and disengagment of the inter-axle differential, optimization of conditions, for example, minimizing damage and excessive wear of IAD components, improving the engagement/disengagement timing of the inter-axle differential locking mechanism, and enhancing the actuation of the engagement/disengagement, can still be made.

SUMMARY OF THE INVENTION

The present invention relates to an actuation enhancement for a vehicle inter-axle differential (IAD) locking system that is used in a vehicle having an engine and a tandem drive axle. The automated IAD lock system comprises a single inter-axle differential having a clutch locking mechanism, the clutch locking mechanism being capable of an engagement mode and a disengagement mode, and at least one microprocessor. When the clutch locking mechanism is placed in the engagement mode or placed in the disengagement mode, the microprocessor momentarily communicates a data link message to an engine electronic control unit (ECU) so as to break engine torque, thus facilitating engagement or disengagement of the clutch locking mechanism.

Further advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
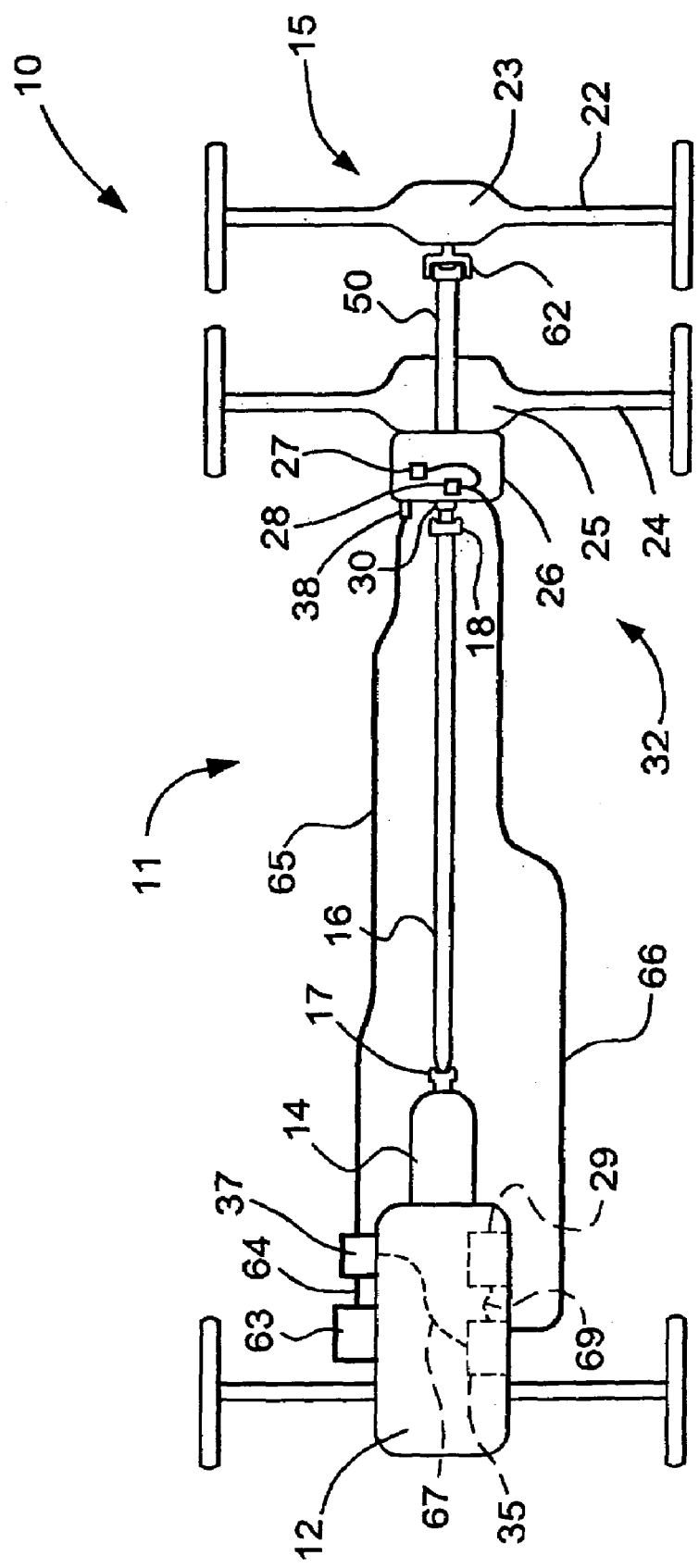
FIG. 1 is a mechanical schematic of a top-plan view of a vehicle in accordance with the present invention.

Preferably, the present invention uses an automatic inter-axle differential (IAD) locking system 10 for a vehicle 11 having a tandem drive axle assembly 15, as generally illustrated in FIG. 1. The vehicle 11 has an engine 12, which is drivingly connected to a transmission 14. A main drive shaft 16 extends longitudinally from the transmission 14 to the tandem drive axle assembly 15, and may be coupled at one end via a conventional coupling 17, such as a yoke or a universal joint, to the transmission 14, and at the other end by another conventional coupling 18 to an input shaft 30 of the tandem drive axle assembly 15.

Vehicle 11 may be any vehicle having a tandem drive axle assembly, such as a truck, bus or other over-the-road vehicle which has a tandem drive axle assembly comprising two axially spaced axles. The tandem drive axle assembly 15 is usually located near the rear of a vehicle and may, therefore, be referred to herein as a tandem drive rear axle assembly. The tandem drive rear axle assembly 15 comprises a rearward rear axle 22, which in turn comprises axially aligned right and left axle shafts (not shown), which are driven through an axle differential 23. In addition, a forward rear axle 24 also comprises axially aligned right and left axle shafts (not shown), which are driven through an axle differential 25. The axles 22 and 24 of the tandem rear axle assembly 15 herein are axially spaced apart but are in proximity with each other toward the rear of the vehicle 11.

All parts of both the vehicle 11 as a whole and the tandem drive rear axle assembly 15 described so far may be conventional. Thus, the two axle differentials 23 and 25 (which are to be distinguished from an inter-axle differential to be subsequently described) may be conventional.

Figure 2:
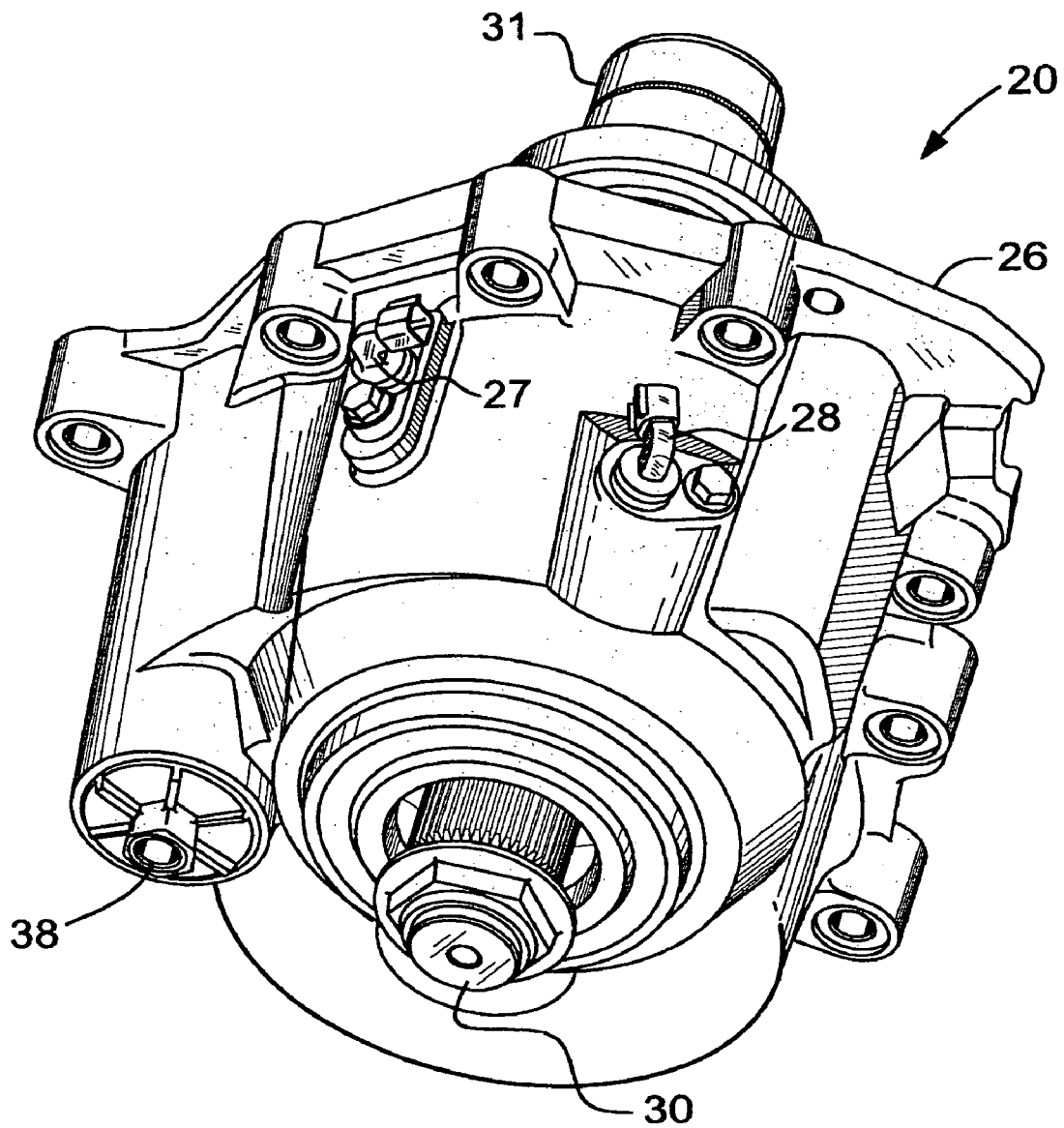
FIG. 2 is a three dimensional view of an inter-axle differential in accordance with the present invention.

Turning to FIG. 2, a tandem inter-axle assembly 20 of the preferred embodiment has a housing 26 at its forward end to rotatably support the longitudinally extending input shaft 30, which may be axially aligned with the vehicle drive shaft 16. The forward end of input shaft 30 is coupled to vehicle main drive shaft 16 in direct drive relationship by means of the coupling 18. The input shaft 30 is received in the inter-axle differential 20 for transmitting input torque from the vehicle main drive shaft 16 to the inter-axle differential 20. Also shown in FIG. 2 are an inter-axle output shaft 31 that transmits torque to the rearward rear axle 22 (via an output drive shaft 50 and a rearward coupling 62, as shown in FIG. 1), a rotating side helical gear speed sensor 27, and a rotating sliding clutch lock speed sensor 28. The sensors 27, 28 may be conventionally available sensors, for example, Dana Corporation part number 673425 or Wabash part number 9184.

Figure 3:
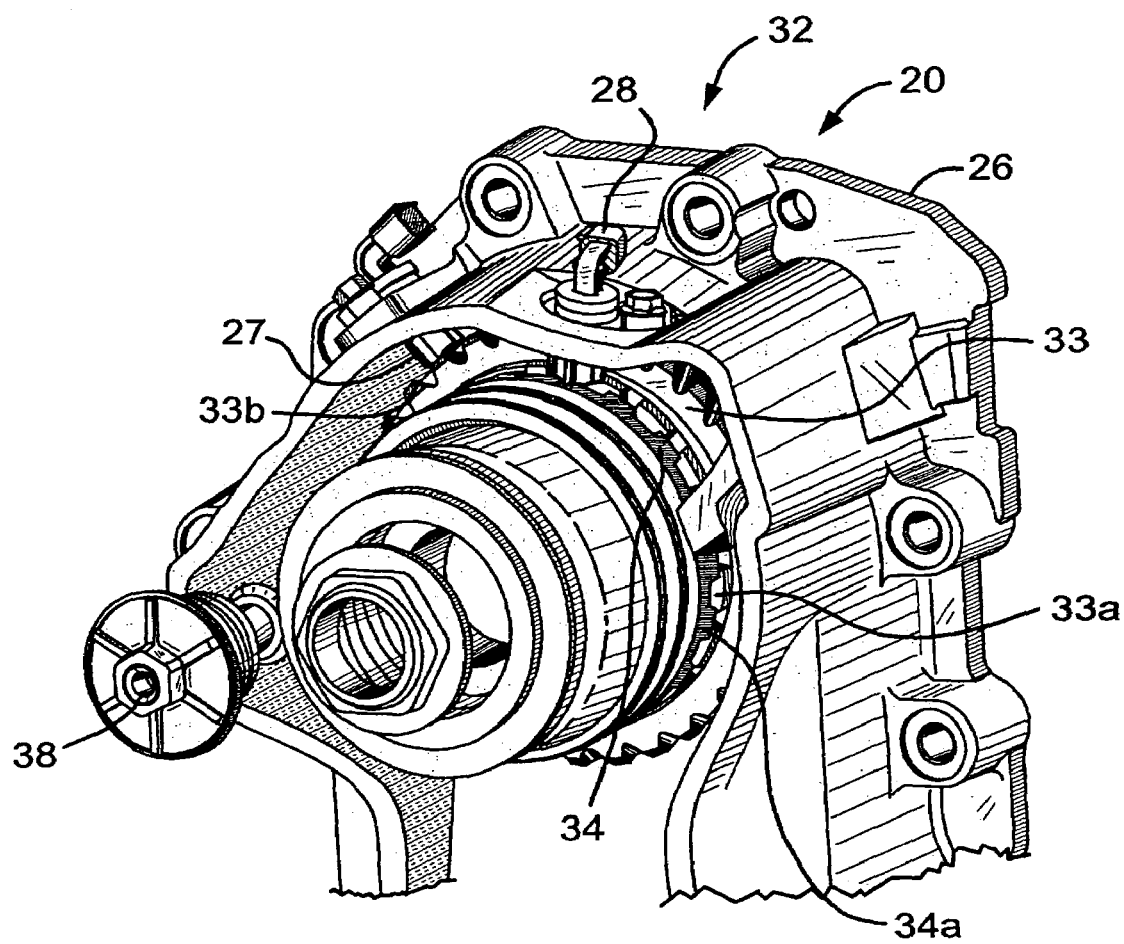
FIG. 3 is a partial cut-away of the three dimensional view of the inter-axle differential of FIG. 2.

As illustrated in FIG. 3, the vehicle IAD 20 further comprises a clutch locking mechanism 32 that includes a rotating side helical gear 33 and a rotating sliding clutch 34. As shown in FIG. 3, the sliding clutch lock mechanism 32 is engaged and subsequently locked, where locked is defined as helical gear teeth 33a and sliding clutch teeth 34a being in a meshing relationship. Helical gear teeth 33a are preferably in a fixed position.

Figure 4:
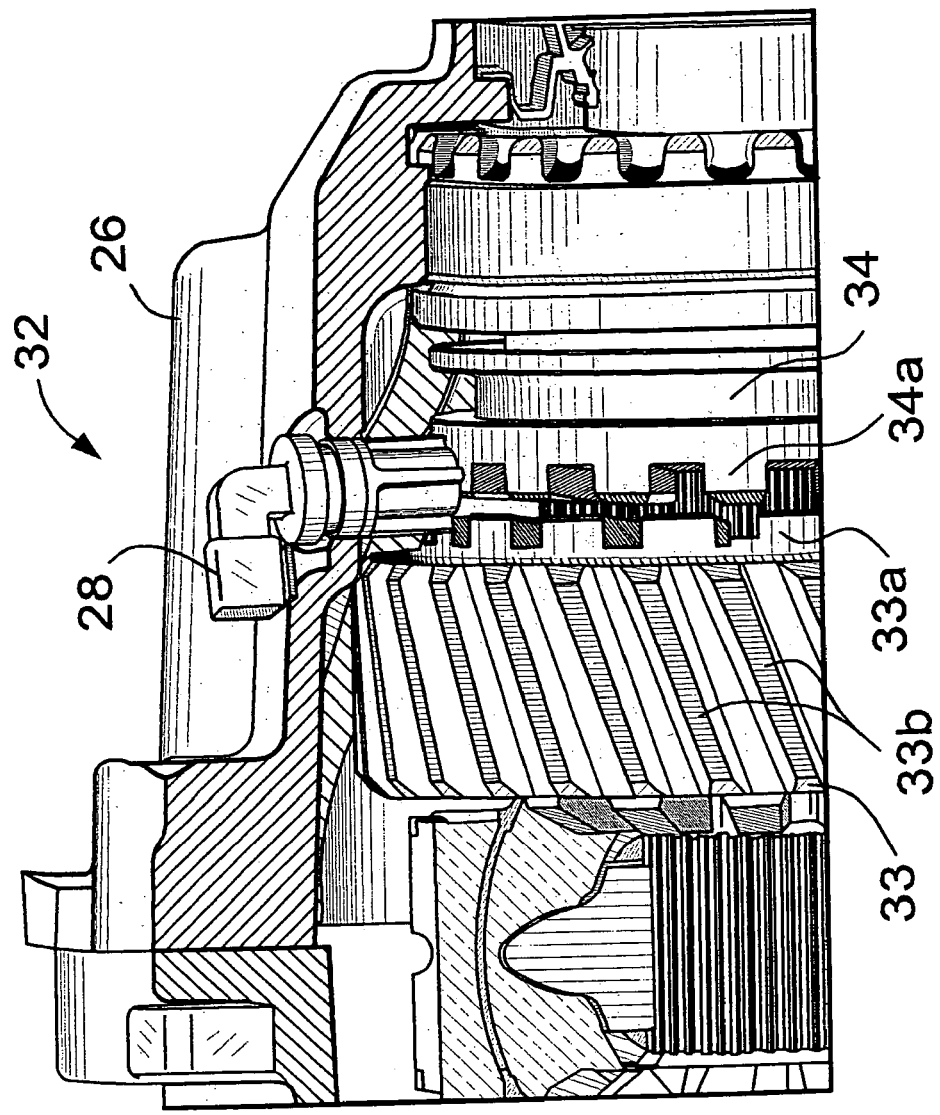
FIG. 4 is a partial cut-away of a three dimensional side view of the inter-axle differential of FIG. 2.

On the other hand, FIG. 4, which is a partial, side view, cut-away of the cover 26 of the inter-axle differential 20 of FIG. 2, taken near to the sliding clutch sensor 28, illustrates the sliding clutch lock mechanism 32 being disengaged, where the helical gear teeth 33a of the rotating side helical gear 33 and the teeth 34a of the sliding clutch 34 are separated.

Also illustrated in FIG. 4 is the alignment of the sliding clutch speed sensor 28 over the teeth 34a of the sliding clutch 34. When the sliding clutch lock mechanism 32 is disengaged, the sliding clutch speed sensor 28 measures a speed of the sliding clutch 34 by sensing a presence and then an absence of the rotating teeth 34a of the clutch 34 passing below the sliding clutch speed sensor 28. Thus, the sliding clutch speed sensor 28 (via first electrical means 66 shown in FIG. 1) provides a sliding clutch signal to a microprocessor 35 (see FIG. 6, for example, Motorola MC9S12D64 or equivalent and POLE SENSOR INPUT #1/#2 in FIG. 6) for determining the speed of the sliding clutch 34, when the gear 33 and the clutch 34 are disengaged. However, when the clutch mechanism 32 is fully engaged (as in FIG. 3), the sensor 28 measures zero sliding clutch speed even though the sliding clutch 34 continues to rotate.

Figure 6:
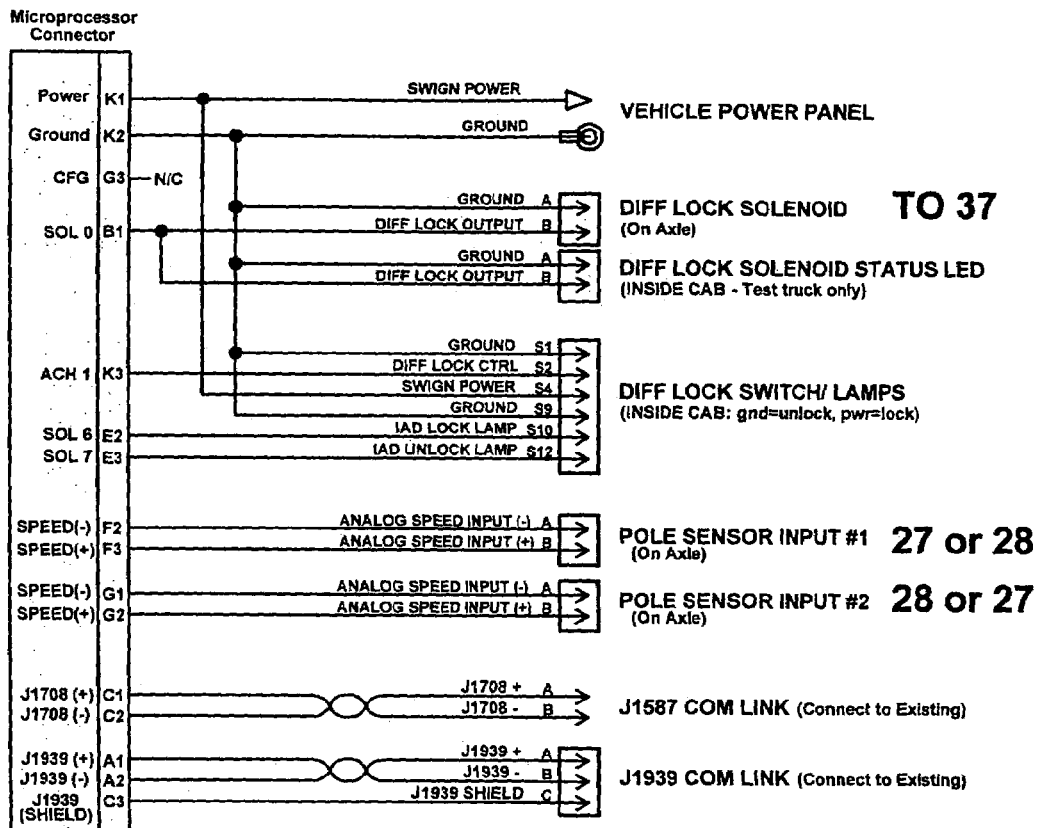
FIG. 6 is an electrical connector diagram in accordance with the present invention.

The helical gear speed sensor 27, shown in FIG. 3, determines the speed of the helical gear 33 by sensing the presence and absence of second helical gear teeth 33b, which provides a helical gear signal to the microprocessor 35 (see POLE SENSOR INPUT #1/#2 in FIG. 6).

When the gear 33 and the clutch 34 are locked, the sliding clutch speed sensor 28 no longer senses the presence and then the absence of the teeth 34a. It is a discovery of the instant invention that when the clutch mechanism 32 is locked, the sliding clutch speed sensor 28 does not provide a signal to the microprocessor 35, even though the sliding clutch 34 continues to rotate, which is due to the specific placement of the clutch sensor 28. The absence of a signal is determined by the microprocessor 35 to mean that the clutch mechanism 32 is locked. Thus, the microprocessor 35 is informed of the locked or unlocked state (or mode) of the clutch mechanism 32,. without requiring a separate sensor in addition to the two speed sensors 27, 28.

A general overview of the IAD system 10 terminology and functions includes the following modes. In auto lock mode, no driver interaction is required and the system automatically detects slipping and locks, for example, for up to 15 seconds. In manual lock mode, the operator presses the lock switch (for example, see FIG. 6) in the vehicle cab and then the IAD 20 locks, for example, for 60 seconds. In manual lock and hold mode, the operator presses and holds the lock switch, for example, for 5 seconds, and then the IAD 20 remains locked until the unlock switch (see, for example, FIG. 6) is pressed or power to the IAD 20 is recycled. In manual unlock and hold mode the operator presses and holds the unlock switch in, for example, for 5 seconds, and then the IAD 20 remains unlocked until the lock switch is pressed or power to the IAD 20 is recycled.

Display lamp functions utilized within the IAD 20 are unlocked lamp solidly lit (IAD lock is disengaged), locked lamp flashing (IAD 20 is attempting to engage the IAD lock), locked lamp solidly lit (IAD 20 has been locked), locked lamp flashing quickly (IAD 20 is in manual lock and hold mode), and unlocked lamp flashing (IAD 20 is attempting to disengage the lock). Note that in the unlocked lamp flashing mode, if the unlocked lamp does not turn solid, which indicates lock disengagement, then the operator is instructed to remove pressure from the throttle momentarily to allow the lock to disengage.

Figure 5:
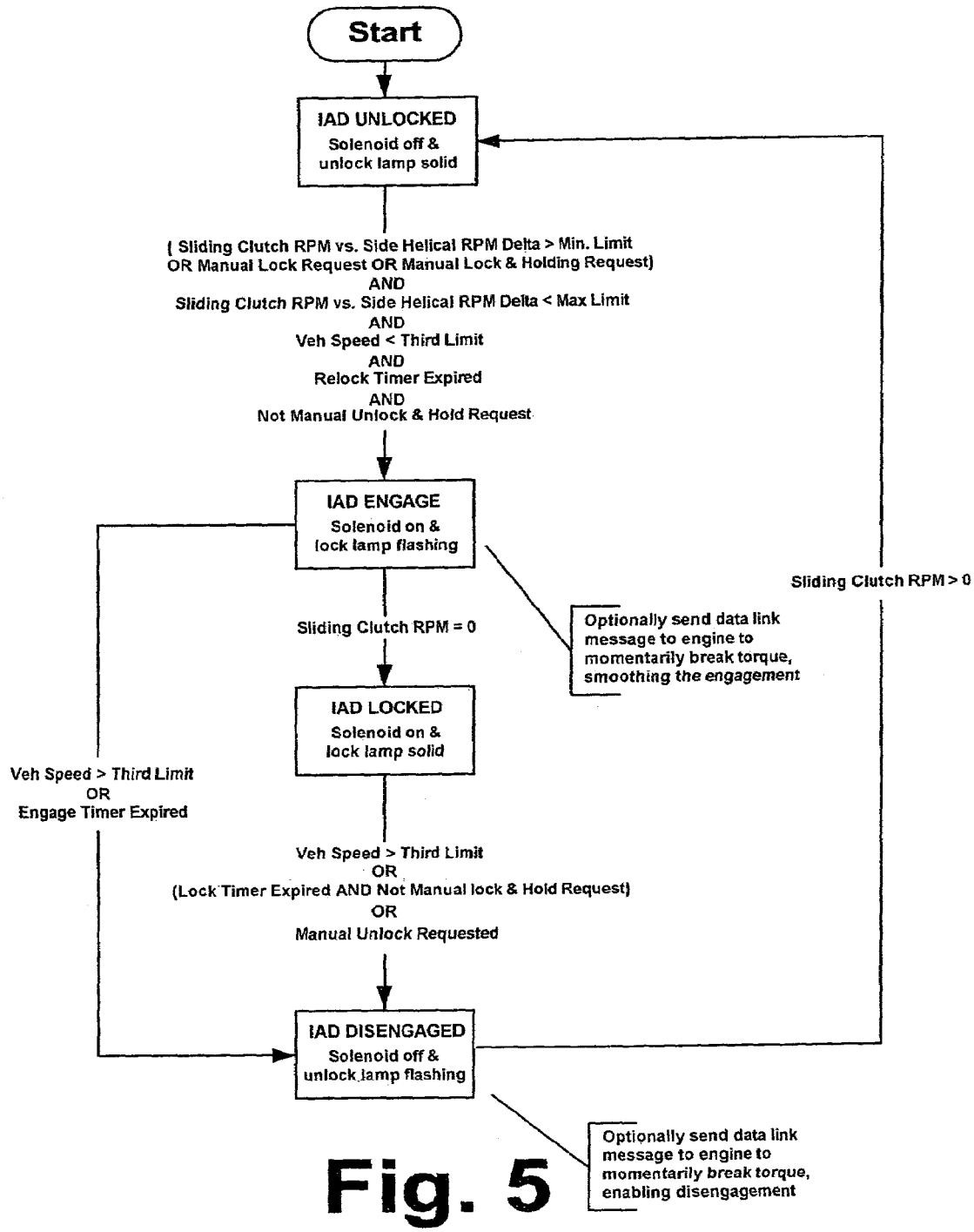
FIG. 5 is a flow chart of the logic in accordance with the present invention.

Referring to FIG. 5, there is shown a flow chart of logic in accordance with the present invention. Upon start up or returning from an IAD disengagement mode, the automatic IAD lock system 10 is in an IAD unlocked mode where an engage solenoid 37 (as shown in FIG. 1) is turned off. The solenoid may be, for example, a KIP Incorporated part number 2P2108. Also, an unlock lamp (see FIG. 6) is preferably turned on solidly in the vehicle compartment to indicate to the operator of the vehicle 11 that the clutch mechanism 32 is unlocked.

In addition, a relock timer is set for a short delay that allows the sliding clutch speed to be established by the system 10 following disengagement that could be configured from milliseconds to seconds, where a preferred implementation would be approximately one second. Note that when the clutch mechanism 32 is engaged, there is no speed signal received from the sliding clutch teeth 34a because the teeth 34a are meshed with the helical teeth 33a, thus providing no gaps therebetween. Therefore, initially following disengagement, the sensor 28 needs this short relock time period before beginning to sense the gaps between the gear teeth 33a, 34a, so as to prevent immediate re-engaging of the IAD clutch mechanism 32.

To change from the IAD unlocked mode to the IAD engaged mode the system 10, through the aid of the microprocessor 35, determines if the following conditions prevail: is the mathematical absolute difference between the sliding clutch 34 revolutions per minute and the side helical gear 33 revolutions per minute greater than a minimum limit (or has a manual lock request or has a manual lock and hold request been initiated), and is the mathematical absolute difference between the sliding clutch 34 revolutions per minute and the side helical gear 33 revolutions per minute less than a maximum limit, and is the speed of the vehicle less than a third limit, and has the relock timer expired, and has no manual unlock and hold been requested.

It can be appreciated by one skilled in the art that the speed of the vehicle 11 may be obtained from the vehicle communication data link, for example, J1587 COMM LINK or J1939 COMM LINK (see FIGS. 6 and 7), which follow the standards set by the Society of Automotive Engineers (SAE). It can further be appreciated that the instant application is not limited by the first electrical means 66 and a second electrical means 69 (for example, wires, connectors, or cables, which could include any present or future SAE COMM LINKS), solenoid 37, the sensors 27, 28, the microprocessor 35, or an engine electronic control unit (ECU) 29 (see FIG. 1), which electrically communicates with the microprocessor 35 via the second electrical means 69.

If, however, the above conditions are met, then the system 10 causes the inter-axle differential clutch mechanism 32 to commence the IAD engage mode by setting an engage timer, by turning on the engage solenoid 37, and by causing the "clock" lamp to flash on and off. The engage timer could be configured to run from seconds to minutes, but a preferred implementation would be approximately fifteen seconds.

While in the IAD engage mode, the system 10 monitors the vehicle speed to determine if the vehicle speed is greater than the third limit and the system 10 monitors the engage timer to see if the engage timer has expired. If either of these two conditions are met then the system 10 places the IAD 20 into the disengaged mode that is described below.

A further discovery of the present invention is that, optionally, when the IAD 20 is in the process of engaging, as discussed above, the system 10 may communicate a vehicle communication data link message (such as a signal to COMM LINK J1939 or the like) to the electronic controls 29 in the engine 12 to momentarily (for example, for a few milliseconds to approximately one second) break engine torque. This discovery has been found to smooth the engagement of the IAD 20.

Although not wishing to be bound by any theory, it is believed that this smooth engagement results from reducing the speed differential and torque between the teeth 33a, 34a as the teeth 33a, 34a engage. The amount of clearance (known as backlash) sets the maximum RPM differential that the two sets of teeth 33a, 34a can be rotating at and still engage properly. It appears that the higher the RPM differential between the two gears 33, 34 makes engagement easier, but this higher RPM differential increases the potential for shock loading when the RPM differential becomes too high. If the two sets of teeth 33a, 34a cannot engage, then they will ratchet (known as "bumping faces") until they meet the maximum engagement RPM differential, which can result in damaging the gear 33 and clutch 34.

Note that the amount of time that the engine torque is disrupted may not be a fixed amount of time. Instead, the amount of time that the engine torque is disrupted for engagement may vary depending upon the speed and/or an acceleration of the vehicle 11, or the mechanical performance of the sliding clutch 34, the helical gear 33, or other parts of the present invention.

Otherwise, following IAD engagement, the system 10 monitors the sliding clutch RPM to see if it is approximately equal to zero (via the sliding clutch speed sensor 28, see, for example, FIG. 6 connections POLE SENSOR SPEED INPUT #1 A-B or #2 A-B). If the sliding clutch RPM is approximately equal to zero, then the system 10 places the IAD 20 into the locked mode via the engage solenoid 37 (see, for example, FIG. 6 connections DIFF LOCK SOLENOID A-B), solidly lights the lock lamp (see, for example, FIG. 6 connection DIFF LOCK SWITCH/LAMPS S10), and initiates a lock timer, which could be configured to run from seconds to minutes, but a preferred implementation would be approximately fifteen seconds.

While in the IAD locked mode, the system 10 monitors the vehicle speed to determine if the vehicle speed is greater than the third limit, or the system 10 monitors the lock timer to see if the lock timer has expired and that the operator has not requested the system 10 to be placed in a manual lock and hold mode, or the system monitors that the operator has not requested manual unlock mode. If any of these conditions has been met, then the system 10 places the IAD 20 into the disengaged mode, which includes turning off the engage solenoid 37, and causing the unlock lamp to flash on and off. Also, the relock timer, as mentioned above, is set for a short delay that allows the sliding clutch speed to be established by the system 10 following disengagement that could be configured from milliseconds to seconds, where a preferred implementation would be approximately one second.

Note that the engage solenoid 37 may be disposed anywhere in/on the vehicle where it will not be damaged. By way of example only, FIG. 1 schematically depicts the solenoid 37 adjacent the engine 12, where the solenoid 37 controls pressurized air flow through the port 38 (see FIGS. 2 and 3).

Figure 8:
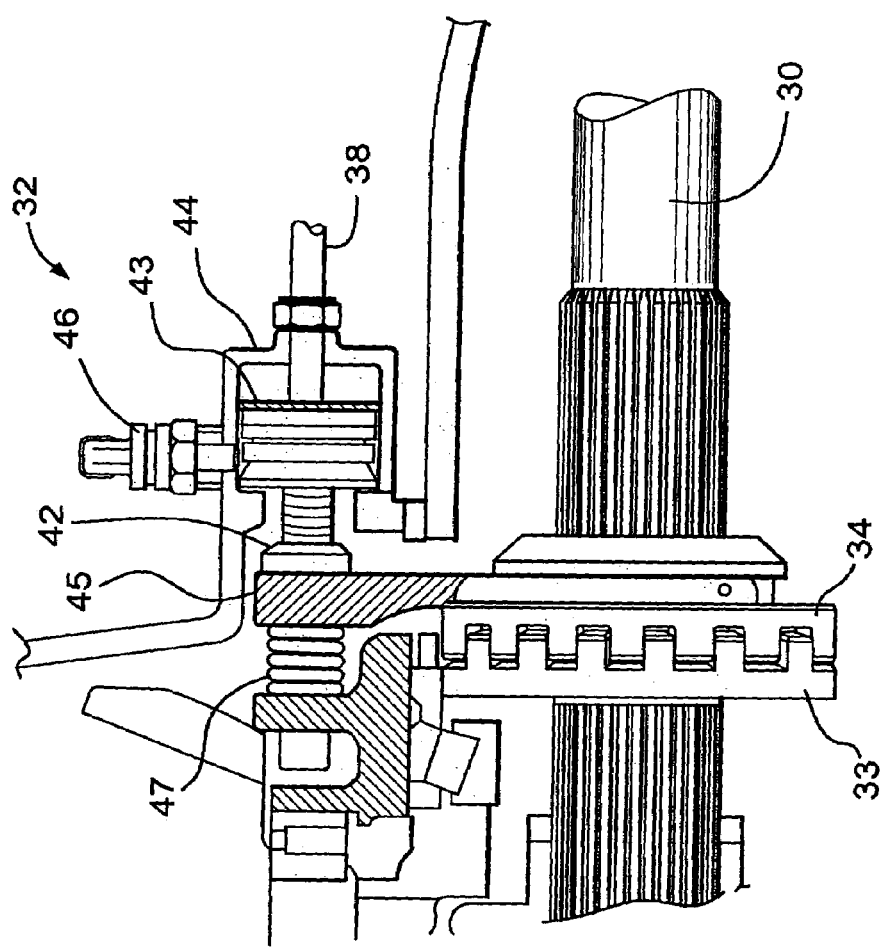
FIG. 8 is a side view of an engaged inter-axle differential in accordance with the present invention.
Figure 9:
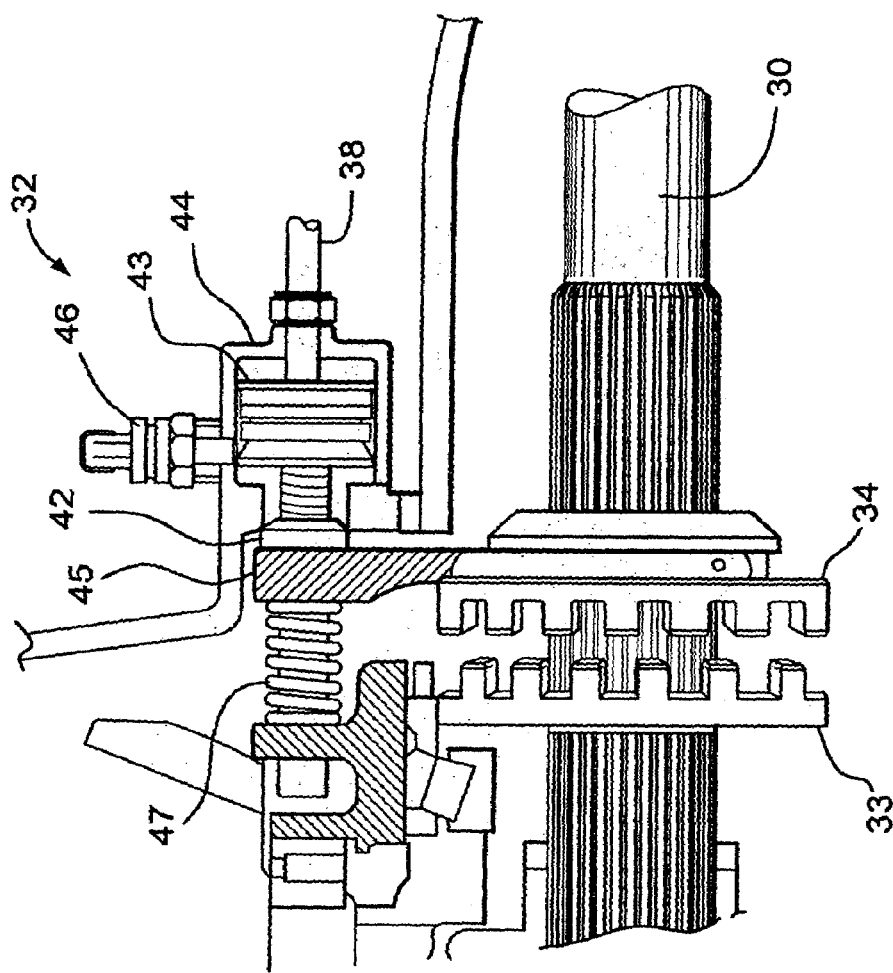
FIG. 9 is a side view of a disengaged inter-axle differential in accordance with the present invention.

As conventionally shown in FIGS. 8 and 9, the air causes the inter-axle differential clutch mechanism 32, which may also include various other elements (such as, for example, a push rod 42, a piston 43, a shift cylinder 44, a shift fork 45, a selector switch 46 (used in a conventional manual control versus the microprocessor 35 control of the present invention), and a spring 47) to engage (FIG. 8) or disengage (FIG. 9). In these illustrations, the air flow is controlled by the selector switch 46, but in the present invention the separate solenoid 37 may be utilized to allow pressurized air to enter or not to enter port 38, which subsequently causes the fork 45 to shift the sliding clutch 34.

Note, however, that it is within the scope and spirit of the present invention that if road conditions result in wheel slip, the system may choose to return to the engage mode. If the wheels do not slip, the system 10 will continue to monitor for any future slip. This procedure assures that the IAD 20 will not stay engaged for longer than necessary. In addition, the manual lock and hold request overrides the lock timer, which allows the system 10 to remain in the locked condition if the operator so chooses.

Another discovery of the present invention is that, optionally, when the IAD 20 is in this process of disengaging, the system 10 may communicate a vehicle communication data link message to the electronic controls 29 in the engine 12 to momentarily (for example, for a few milliseconds to approximately one second) break engine torque. This discovery has been found to smooth the disengagement of the IAD 20.

Although not wishing to be bound by any theory, it is believed that this smooth disengagement results from reducing the torque between the teeth 33a, 34a.

It should be appreciated that the amount of time that the engine torque is disrupted may not be a fixed amount of time. Instead, the amount of time that the engine torque is disrupted for disengagement may vary depending upon the speed and acceleration of the vehicle 11, the sliding clutch 34, the helical gear 33, or other parts of the present invention.

While in the IAD disengage mode, the system 10 monitors the sliding clutch RPM so as to determine if the sliding clutch 34 is greater than zero (i.e., the teeth 33a, 34a are no longer meshed). If the sliding clutch RPM is greater than zero, then the system 10 returns the IAD 20 to the unlocked mode, as discussed above, where the engage solenoid 37 remains off and the "unlock lamp" is turned on solid in the vehicle compartment to indicate to the operator of the vehicle 11 that the clutch mechanism 32 is unlocked. The relock timer is also initiated at this time.

Returning to FIG. 1, there is illustrated the interconnection of various electrical and pneumatic parts that are described above. The microprocessor 35 is electrically connected to the sensors 27, 28 by the first electrical means 66, and the microprocessor 35 is electrically connected to the solenoid 37 by third electrical means 67. Although shown located within the engine 12, the microprocessor 35 could be located elsewhere. A source of compressed air 63 is pneumatically connected to the solenoid 37 by first pneumatic means 64, while the solenoid 37 would also be pneumatically connected by second pneumatic means 65 to the compressed air port 38, for controlling the engagement/disengagement of the clutch mechanism 32. The source of compressed air 63 could be a separate source or a part of the engine 12.

Figure 7:
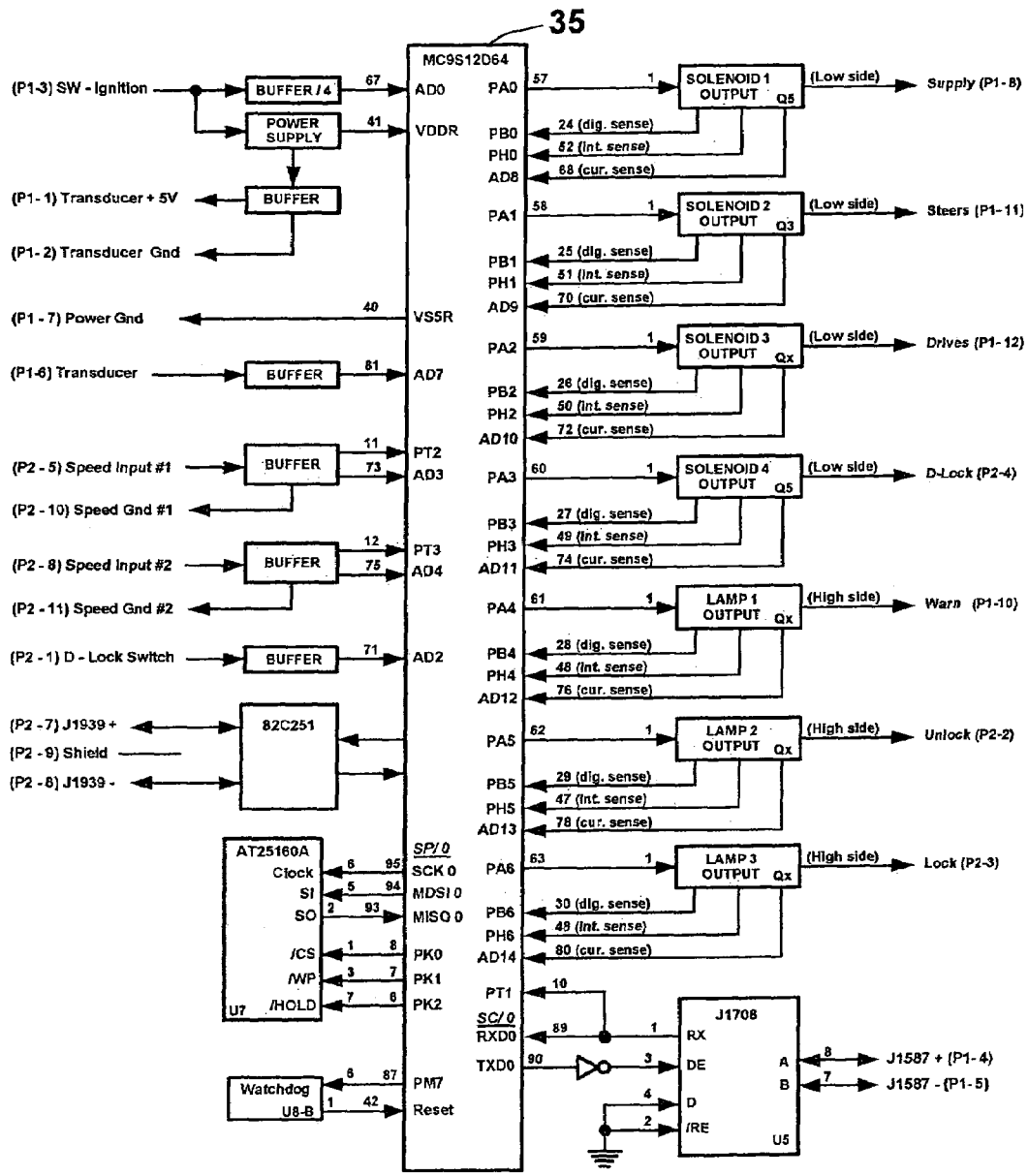
FIG. 7 is an electrical schematic of a microprocessor in accordance with the present invention.

FIGS. 6 and 7 illustrate various embodiments of electrical connects between the microprocessor 35 the inputs and outputs (for example, 27, 28, 37 (via the first electrical means 66) and various conventional lamps/LEDs) for the system 10. It may be appreciated that the system 10 is not limited by the lamps, LEDs, solenoids, and/or the pneumatic means to cause air to flow to the shift fork 45 that causes engagement, disengagement, and locking of the locking mechanism 32.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. An inter-axle differential locking system for a vehicle having an engine and a tandem drive axle, comprising:
    a single inter-axle differential having a clutch locking mechanism, said clutch locking mechanism being capable of an engagement mode and a disengagement mode; and
    at least one microprocessor;
    wherein when said clutch locking mechanism is placed in said engagement mode or placed in said disengagement mode, said microprocessor momentarily communicates a data link message to an engine electronic control unit to break engine torque to facilitate an engagement or a disengagement of said clutch locking mechanism.

2. The inter-axle differential locking system of claim 1, wherein said clutch mechanism includes a rotating side helical gear that has helical gear teeth and a rotating sliding clutch that has sliding clutch teeth, and when said clutch mechanism is placed in said engagement mode, said engine torque is disrupted for an amount of time in a range of a few milliseconds to approximately one second, thus reducing the speed differential and torque between said helical gear teeth and said sliding clutch teeth.

3. The inter-axle differential locking system of claim 1, wherein said clutch mechanism includes a rotating side helical gear that has helical gear teeth and a rotating sliding clutch that has sliding clutch teeth, and when said clutch mechanism is placed in said disengagement mode, said engine torque is disrupted for an amount of time in a range of a few milliseconds to approximately one second, thus reducing the torque between said helical gear teeth and said sliding clutch teeth.

4. The inter-axle differential locking system of claim 1, wherein an amount of time that said engine torque is disrupted is dependent upon the speed and/or acceleration of said vehicle and/or said clutch locking mechanism.

5. The inter-axle differential locking system of claim 1, further comprising a solenoid, which is in communication with said microprocessor for controlling said engagement or said disengagement of said inter-axle differential.

6. The inter-axle differential locking system of claim 1, wherein said inter-axle differential further comprises a pneumatic port, a shift fork, a push rod, a piston, and a shift cylinder.

7. An inter-axle differential locking system for a vehicle having an engine and a tandem drive axle, comprising:
- an inter-axle differential of a vehicle having a rotating sliding clutch and a rotating side helical gear, said sliding clutch and said helical gear being capable of an engagement mode and a disengagement mode;
- a microprocessor; and
- an electrical connection between said microprocessor and an engine electronic control;
- wherein when said sliding clutch and said helical gear are placed in said engagement mode or placed in said disengagement mode, said microprocessor momentarily communicates a communication data link message over said electrical connection to said engine electronic control unit to break engine torque, in order to facilitate engagement or disengagement of said sliding clutch and said helical gear.

8. The inter-axle differential locking system of claim 7, wherein said side helical gear has helical gear teeth and said sliding clutch has sliding clutch teeth, and when said side helical gear and said sliding clutch are placed in said engagement mode, said engine torque is disrupted for an amount of time in a range of a few milliseconds to approximately one second, thus reducing the speed differential and torque between said helical ear teeth and said sliding clutch teeth.

9. The inter-axle differential locking system of claim 7, wherein said side helical gear has helical gear teeth and said sliding clutch has sliding clutch teeth, and when said side helical gear and said sliding clutch are placed in said disengagement mode, said engine torque is disrupted for an amount of time in a range of a few milliseconds to approximately one second, thus reducing the torque between said helical gear teeth and said sliding clutch teeth.

10. The inter-axle differential locking system of claim 7, wherein an amount of time that said engine torque is disrupted is dependent upon the speed and/or acceleration of said vehicle, and/or said sliding clutch, and/or said helical gear.

11. An inter-axle differential lock actuation enhancement method for an automated inter-axle differential locking system for a vehicle having a tandem drive axle, comprising:
- providing a single inter-axle differential having a clutch locking mechanism for the vehicle, said clutch locking mechanism being capable of an engagement mode and a disengagement mode;
- providing at least one microprocessor;
- placing said clutch locking mechanism in said engagement mode or placing said clutch locking mechanism in said disengagement mode; and
- momentarily communicating a data link message to an engine electronic control unit to break engine torque, thus facilitating said engagement or said disengagement of said clutch locking mechanism.

12. The inter-axle differential lock actuation enhancement method of claim 11, further comprising providing a signal within an operator's compartment of said vehicle that said inter-axle differential is engaged or disengaged.

* * * * *